US009633207B2

(12) United States Patent
Ech-Chergui et al.

(10) Patent No.: US 9,633,207 B2
(45) Date of Patent: Apr. 25, 2017

(54) METHOD FOR DOWNLOADING AT LEAST ONE SOFTWARE COMPONENT ONTO A COMPUTING DEVICE, AND ASSOCIATED COMPUTER PROGRAM PRODUCT, COMPUTING DEVICE AND COMPUTER SYSTEM

(71) Applicant: THALES, Neuilly sur Seine (FR)

(72) Inventors: Ben Youcef Ech-Chergui, Cholet (FR); Ludovic Derouet, Cholet (FR)

(73) Assignee: THALES, Courbevoie (FR)

( * ) Notice: Subject to any disclaimer, the term of this patent is extended or adjusted under 35 U.S.C. 154(b) by 55 days.

(21) Appl. No.: 14/693,780

(22) Filed: Apr. 22, 2015

(65) Prior Publication Data

US 2015/0332051 A1   Nov. 19, 2015

Related U.S. Application Data

(63) Continuation of application No. PCT/EP2013/072057, filed on Oct. 22, 2013.

(30) Foreign Application Priority Data

Oct. 23, 2012   (FR) ..................................... 12 02824

(51) Int. Cl.
*H04L 9/32*  (2006.01)
*G06F 21/57* (2013.01)
(Continued)

(52) U.S. Cl.
CPC .............. *G06F 21/572* (2013.01); *G06F 8/60* (2013.01); *G06F 21/57* (2013.01); *H04L 63/08* (2013.01);
(Continued)

(58) Field of Classification Search
None
See application file for complete search history.

(56) References Cited

U.S. PATENT DOCUMENTS

| 6,105,134 A * | 8/2000 | Pinder ..................... H04L 63/04 348/E5.004 |
| 6,389,538 B1 * | 5/2002 | Gruse ..................... G06F 21/10 705/51 |

(Continued)

OTHER PUBLICATIONS

International Search Report dated Feb. 10, 2014 for Intl. Patent App. No. PCT/EP2013/072057, filed Oct. 22, 2013.

Primary Examiner — Brandon Hoffman
(74) Attorney, Agent, or Firm — Knobbe, Martens, Olson & Bear, LLP

(57) ABSTRACT

A method for downloading at least one software component onto a computing device, and associated computer program product, computing device and computer system are disclosed. In one aspect, the method is implemented by the computer device including an information processing unit having a memory. The downloading method includes downloading to the memory of a first application from a first distribution capability and connection to a second distribution capability via the first application. The connection to the second distribution capability is performed in a secure manner using an authentication code. The downloading method further includes downloading to the memory of a second application from the second distribution capability, secure connection to a third distribution capability via the second application, and downloading to the memory of each software component from the third distribution capability.

14 Claims, 3 Drawing Sheets

(51) Int. Cl.
*H04L 29/08* (2006.01)
*H04L 29/06* (2006.01)
*G06F 9/445* (2006.01)

(52) U.S. Cl.
CPC ........ *H04L 67/10* (2013.01); *G06F 2221/033* (2013.01)

(56) References Cited

U.S. PATENT DOCUMENTS

| | | | |
|---|---|---|---|
| 6,560,581 B1 * | 5/2003 | Fox | G06Q 20/00 380/45 |
| 2008/0170696 A1 | 7/2008 | Yoshimura et al. | |
| 2011/0138181 A1 * | 6/2011 | Wolf | H04L 9/085 713/168 |
| 2012/0210443 A1 | 8/2012 | Blaisdell et al. | |

* cited by examiner

METHOD FOR DOWNLOADING AT LEAST ONE SOFTWARE COMPONENT ONTO A COMPUTING DEVICE, AND ASSOCIATED COMPUTER PROGRAM PRODUCT, COMPUTING DEVICE AND COMPUTER SYSTEM

CROSS-REFERENCE TO RELATED APPLICATIONS

This application is a continuation of International Application No. PCT/EP2013/072057, filed Oct. 22, 2013, which claims benefit under 35 U.S.C. §119 of French Application No. 12 02824, filed Oct. 23, 2012, which are herein incorporated by reference in their entirety.

BACKGROUND

The described technology generally relates to a downloading method for downloading at least one software component onto a computing device, such as a mobile phone, the downloading method being implemented by the computing device comprising an information processing unit having a memory, the downloading method comprising the following steps:
  downloading to the memory of a first application from a first distribution capability,
  connection, via the first application, to a second distribution capability.

The described technology also relates to a non-transitory computer-readable medium including a computer program comprising software instructions which, when implemented by an information processing unit integrated in a computing device, implement such a downloading method.

The described technology also relates to a computing device, such as a mobile phone, including an information processing unit having a memory, the memory including a downloading application for downloading at least one software component, the downloading application comprising:
  a first capability for downloading a first application to the memory from a first distribution capability, the first application being capable of connecting to a second distribution capability.

The described technology also relates to a computer system comprising such a computing device.

One knows computing devices, such as a mobile terminal, that are run by an Android platform hosting various applications. The Android platform includes a Linux kernel, a set of library functions in C or C++, and a Dalvik Virtual Machine that is able to run the applications hosted by the Android platform.

For downloading one or more software components, one knows the use of the Google Play® system or a public server in order to download a first application, the first application being adapted to then connect it to a dedicated server to download the software component(s).

However, such downloading is not very secure, and it is, in particular, possible to corrupt the communication with the dedicated server. In addition, the download requires one to have a Google® account in order to download the first application, which is not always compatible with some applications such as the deployment of software components within an IT infrastructure of an enterprise.

SUMMARY OF CERTAIN INVENTIVE ASPECTS

An objective of certain inventive aspects is thus to provide a method for downloading at least one software component in order to improve the security of the software component(s), while facilitating the implementation of said downloading.

To this end, one inventive aspect is a downloading method of the aforementioned type, wherein the connection to the second distribution capability is performed in a secure manner using an authentication code, and wherein the downloading method further comprises the following steps:
  downloading to the memory of a second application from the second distribution capability,
  secure connection via the second application to a third distribution capability, and
  downloading to the memory of the software component(s) from the third distribution capability.

According to other aspects, the downloading method comprises one or more of the following features, taken in isolation or in any technically possible combinations:
  the second application is encapsulated in a package protected by cryptographic protection, and during the downloading the second application, the protected package is sent from the second distribution capability to the computing device;
  after downloading the package with the second application, the first application performs a cryptographic operation using the cryptographic protection code in order to extract the second application package;
  when connecting to the third distribution capability and/or downloading the software component(s), the data exchanged between the third distribution capability and the computing device are protected by cryptographic protection;
  security elements associated with the cryptographic protection of the data exchanged between the third distribution capability and the computing device are stored in a security container, the security container being cryptographically protected by an unlock code, and said container is encapsulated in the protected package received from the second distribution capability;
  the authentication code, the cryptographic protection code and the unlock code are stored in the memory of the computing device, prior to downloading the first application;
  the downloading of the second application is performed directly by the first application;
  the connection step to the third distribution capability includes authentication of the computing device at the third distribution capability and authentication of the third distribution capability at the computing device in order to perform reciprocal authentication of the computing device and the third distribution capability.

Another aspect is a non-transitory computer-readable medium including a computer program comprising software instructions that, when implemented by an information processing unit integrated in a computing device, implements a downloading method as defined above.

Another aspect is a computing device of the aforementioned type, wherein the first application is arranged to connect to the second distribution capability in a secure manner using an authentication code, and wherein the memory is able to store:
  a second capability for downloading a second application to the memory from the second distribution capability, the second application being adapted to connect securely to a third distribution capability; and
  a third downloading capability for the software component(s) from the third distribution capability to the memory.

Another aspect is a computer system comprising at least one computing device, a first distribution capability, such as a first server, a second distribution capability, such as a second server, and a third distribution capability, such as a third server, the distribution capabilities being connected to the computing device(s) by a data link, wherein the computing device is as defined above.

According to another aspect, the computer system has the following feature: the system further comprises a deployment capability, such as a deployment server, the deployment capability being configured to request the creation of a first repository at the second distribution capability, and to send the second application to the second distribution capability for inclusion in the first repository, the deployment capability being configured to request the creation of a second repository at the third distribution capability, and to send the software component(s) to the third distribution capability for inclusion in the second repository.

BRIEF DESCRIPTION OF THE DRAWINGS

These features and advantages of the described technology will become apparent on reading the description given below that is solely in the form of a non-limiting example, and with reference to the accompanying drawings, in which.

DETAILED DESCRIPTION OF CERTAIN INVENTIVE EMBODIMENTS

Figure 1:
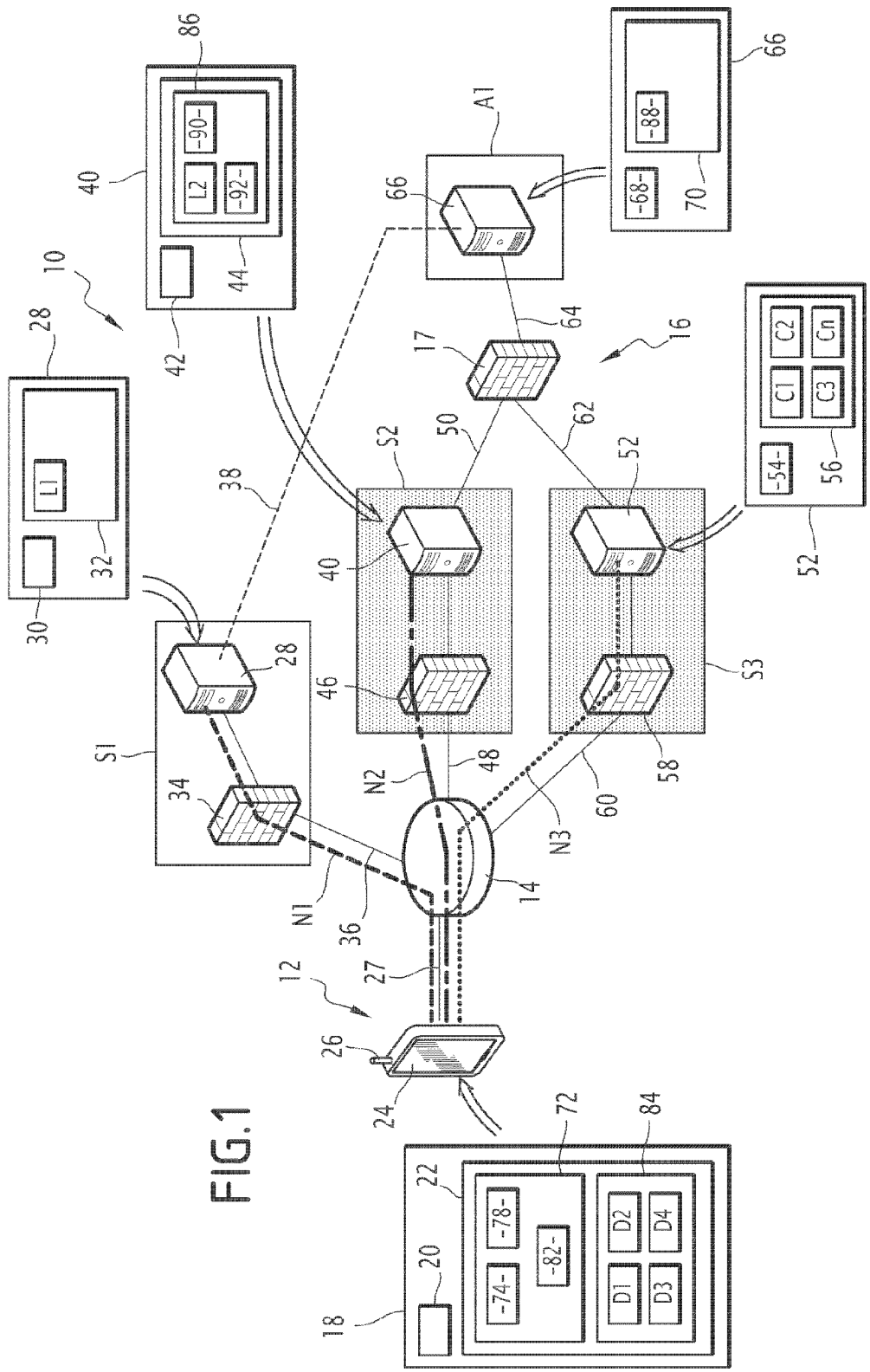
FIG. 1 shows a schematic view of a computer system according to an embodiment, comprising a computing device, a first distribution server, a second distribution server and a third distribution server, each distribution server being connected to the computing device.

In FIG. 1, a computer system 10 includes at least one computing device 12, such as a mobile terminal, a first distribution capability S1, a second distribution capability S2 and a third distribution capability S3, each distribution capability S1, S2, S3 being connected to the computing device 12 via a public network 14, such as the Internet.

The computer system 10 desirably includes a plurality of computing devices 12, although only a single computing device 12 is shown in FIG. 1 for clarity, and each computing device 12 being connected to the first, second and third distribution capabilities S1, S2, S3 via the public network 14.

In addition, the computer system 10 includes a deployment capability A1 connected to the second and third distribution capabilities S2, S3 via a private network 16 comprising a first firewall 17.

The computing device 12 comprises a first information processing unit 18, formed, for example, by a first processor 20 and a first memory 22 associated with the first processor, and a screen 24.

In the example shown in FIG. 1, the computing device 12 is a mobile phone, and further comprises a radio antenna 26 and a radio transmitter-receiver (not shown) connected to the first information processing unit 18.

The computing device 12 is linked to the public network 14 using a first data link 27, such as a radio data link.

The mobile phone 12 is, for example, a smartphone and is managed by an operating system such as the Android operating system of the company Google®.

The first distribution capability S1 is, for example, a computer server, and comprises a second information processing unit 28, formed, for example, by a second processor 30 and a second memory 32 associated with the second processor. The first distribution server S1 is, for example, a public access server.

In addition, the first distribution server S1 has a second firewall 34 to prevent denial of service attacks, the second firewall 34 being connected between the second information processing unit 28 and the public network 14. The first distribution server S1 has a first security level N1.

The first distribution server S1 is linked to the public network 14 using a second data link 36. In addition, it is capable of being connected to the deployment capability A1 by using a third data link 38 when deploying applications to said repositories.

The second distribution capability S2 is, for example, a computer server, and comprises a third processing unit 40, formed, for example, by a third processor 42 and a third memory 44 associated with the third processor.

The second distribution server S2 comprises a third firewall 46 connected between the third processing unit 40 and the public network 14.

The second distribution server S2 has a second security level N2. The second security level N2 is higher than the first security level N1, the second distribution server S2 providing an authentication function for the connections and a cryptographic protection function for the data exchanges, as is described in more detail below.

The second distribution server S2 is linked to the public network 14 by using a fourth data link 48 such as a wired data link. The second distribution server S2 is connected to the first firewall 17 in the private network using a fifth data link 50.

The third distribution capability S3 is, for example, a computer server, and comprises a fourth information processing unit 52, formed, for example, by a fourth processor 54 and a fourth memory 56 associated with the fourth processor.

The third distribution server S3 comprises a fourth firewall 58 connected between the fourth information processing unit 52 and the public network 14.

The third distribution server S3 has a third security level N3. The third security level N3 is desirably greater than the second security level N2, the third distribution server S3 providing a function for the strong authentication of the connections and a function for the cryptographic protection of the data exchanges, as is described in more detail below. The third security level N3 is higher than the first security level N1.

The level of security will thus be different depending on whether the computing device 12 is connected to the first distribution server S1, the second distribution server S2 or the third distribution server S3, as shown in FIG. 1 by the various broken lines associated with the various security levels N1, N2, N3. In the example shown in FIG. 1, the connection to the first distribution server S1 represented by the line N1, is an unauthenticated connection, the connection to the second distribution server S2 represented by the line N2 is an encrypted connection with simple authentication, while the connection to the third distribution server S3 represented by the line N3 is an encrypted connection with cryptographic authentication.

The third distribution server S3 is connected to the public network 14 by using a sixth data link 60 such as a wired data link. The third distribution server S3 is connected to the first firewall 17 in the private network using a seventh data link 62.

The third distribution server S3 is, for example, intended to be connected to the information system of an enterprise wishing to implement the downloading of the software component(s) C1, C2, C3 in a fleet of computing devices 12 used by employees of the enterprise.

In the example shown in FIG. 1, the first, second and third distribution servers S1, S2, S3 are computer servers separate from one another. In an alternative not shown, the second distribution S2 capability and the third distribution capability S3 are integrated in a single computer server separate from the first distribution server S1, the second and third distribution capabilities S2, S3 being private access, while the first distribution capability S1 is public access.

The deployment capability A1 is adapted to request the creation of repositories at the second and third distribution capabilities S2, S3 and to deploy applications to those repositories.

The deployment capability A1 is linked to the first firewall 17 in the private network using an eighth data link 64, and includes a fifth information processing unit 66, formed, for example, by a fifth processor 68 and a fifth memory 70 associated with the fifth processor.

The first memory 22 is capable of storing a downloading application 72 of at least one software component C1, C2, C3 in the memory of the computing device 12. The downloading application 72 includes a first downloading capability 74 of a first application L1 to the first memory 22 from the first distribution server S1, the first application L1 being adapted to connect securely to the second distribution server S2 using an authentication code.

The first memory 22 is also adapted to store a second capability 78 for downloading a second application L2 to the first memory 22 from the second distribution server S2, the second application L2 being adapted to connect securely to the third distribution server S3. The first downloading capability 7 and the second downloading capability 78 are, for example, in the form of software functions included in the downloading application 72, as shown in FIG. 1.

Alternatively, the first application L1 forms the second downloading capability 78, the first application L1 being adapted to perform directly the downloading of the second application L2 from the second distribution server S2. This alternative is desirable because it facilitates the downloading of the software components C1, C2, C3 for the user.

The first memory 22 is also adapted to store a third capability 82 for downloading the software components C1, C2, C3 to the first memory 22 from the third distribution server S3. The third downloading capability 82 is, for example, in the form of a software function integrated in the downloading application 72, as shown in FIG. 1.

Alternatively, the second application L2 forms the third downloading capability 82, the second application L2 being adapted to perform directly the downloading of the software components C1, C2, C3 from the third distribution server S3. This alternative is desirable because it allows even easier downloading of the software components C1, C2, C3 for the user.

The first memory 22 is also adapted to store a deployment file 84 containing specific security elements of the user's own corresponding computing device 12. The deployment file 84 is encoded in a computer language that can be read and decoded by the first application L1.

The second memory 32 is adapted to store the first application L1 for its downloading to the first memory 22 by the first downloading capability 74.

The third memory 44 is adapted to store a data package 86, also known as a data bundle, the data package 86 containing in particular the second application L2.

The fourth memory 56 is adapted to store a plurality of software components C1, C2, C3, . . . , Cn intended to be downloaded securely to the first memory 22 of the computing device(s) 12.

The fifth memory 70 is adapted to store a deployment application 88 that is adapted to request the creation of a first repository (not shown) at the second distribution server S2, the first repository being adapted to the user's own computing device 12, and the deployment application 88 is adapted to send the second application L2 to the second distribution server S2 for inclusion in the first repository. The deployment application 88 is also adapted to request the creation of a second repository (not shown) at the third distribution server S3, the second repository being also adapted to the user's own computing device 12, and the deployment application 88 is adapted to send the software components C1, C2, C3, . . . , Cn to the third distribution server S3 for their insertion in the second repository.

The deployment file 84 desirably contains the address D1 of the second distribution server S2 and an authentication code D2 for connecting securely to the second distribution capability S2. Additionally, the deployment file 84 includes a cryptographic protection code D3 needed for a cryptographic operation performed by the first application L1 in order to extract the second application L2 from the package 86 received from the first distribution server S1. Additionally again, the deployment file 84 contains an unlock code D4 to unlock a security software container 92 received from the second distribution server S2, the security container containing information needed to connect securely to the third distribution server S3.

Each deployment file 84 is specific to a given user, taking into account confidential information that said file contains, while each deployment file 84 differs from one user to the next.

The data package 86 is desirably cryptographically protected, the cryptographic protection code D3 being required to access the information contained in the data package 86, and, in particular, to extract the second application L2. Additionally, the data package 86 contains a secure configuration file 90 associated with the second application L2. Additionally again, the data package 86 includes the security software container 92.

The security container 92 comprises security elements associated with the cryptographic protection of data intended to be exchanged between the third distribution server S3 and the corresponding computing device 12.

Figure 2:
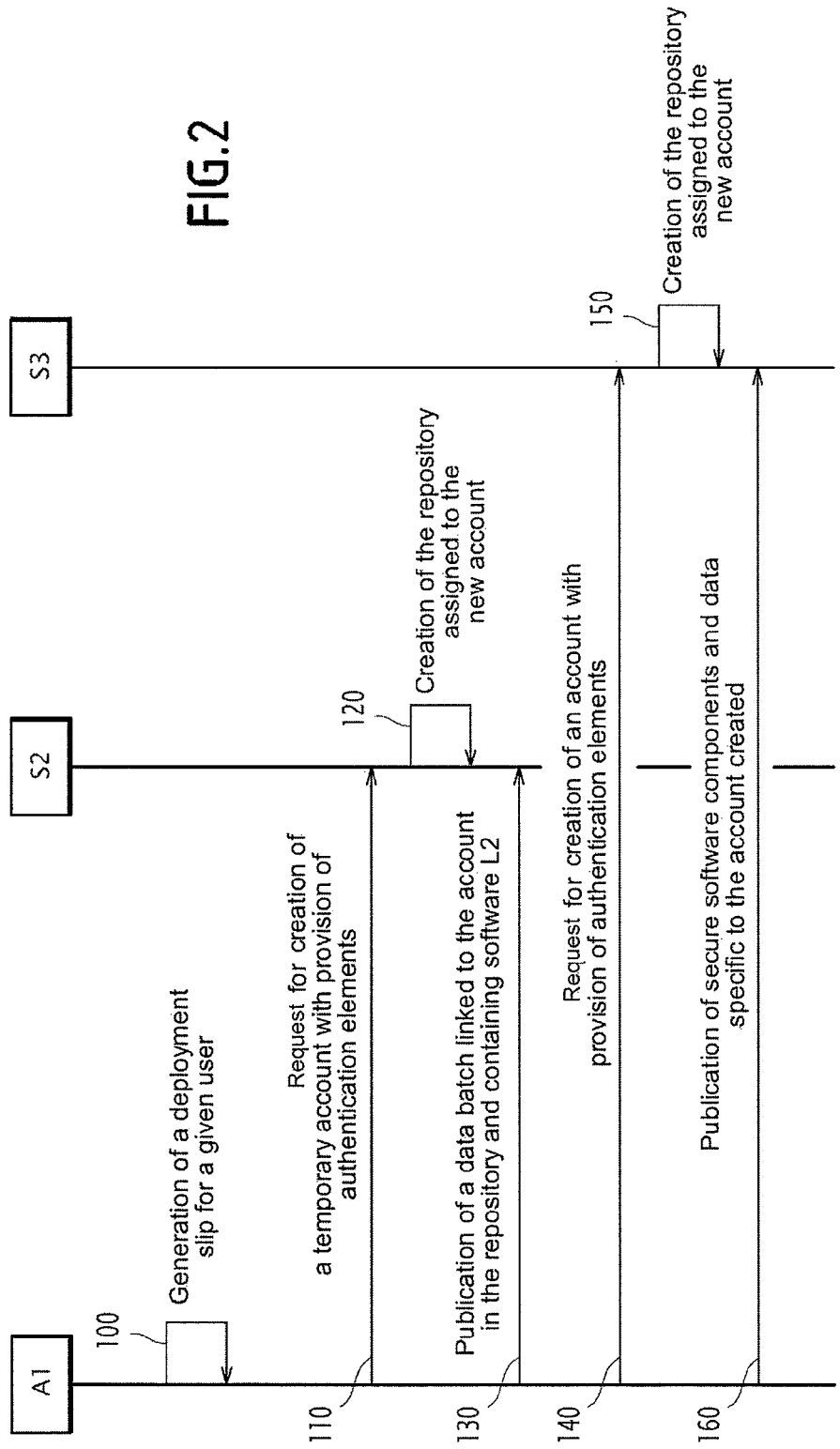
FIG. 2 shows a flowchart of a deployment method with the creation of a first repository at the second distribution server and the creation of a second repository at the third repository at server.

The deployment of the second application L2 in the second distribution server S2 with the creation of the first repository and the associated software components C1, C2, C3, . . . , Cn, along with the creation of the second associated repository, will now be described by using the flowchart in FIG. 2.

This deployment is carried out prior to the downloading method according to at least one embodiment, and a person skilled in the art will understand that the deployment method described hereinafter is only one example among others allowing the storage of the second application L2 in the second distribution server S2, as well as the software components C1, C2, C3, . . . , Cn in the third distribution server S3, with the subsequent secure downloading of the components C1, C2, C3, . . . , Cn to the first memory 22 of the computing device(s) 12.

During the initial step 100, the deployment application 88 generates a slip for a given user, i.e. the user of the mobile phone 12 shown in FIG. 1 in the described example. The slip is then transmitted to the user, for example, via email or even on paper, to be read later by the first application L1 in order to retrieve the address D1 of the second distribution server, the authentication code D2, the cryptographic protection code D3 and the unlock code D4 for their subsequent storage in the first memory 22 of the corresponding computing device 12.

Alternatively, the information D1, D2, D3 and D4 is directly stored in the first memory 22 at a predetermined address without generation and use of the slip.

The deployment application 88 then requests from the second distribution server S2 in step 110, the creation of a first account corresponding to the user, for example, a temporary account, while providing the second distribution server S2 with the authentication code D2 to be associated with the first temporary account to be created.

Following this request from the deployment application 88, the second distribution server S2 creates in step 120, the first repository, the latter being assigned to the first temporary account created for that user.

At step 130, following the creation of the first temporary account in the second distribution server S2, the deployment application 88 publishes the data package 86 intended for the second distribution server S2, said package containing, in particular, the second application L2. The data package 86 is then integrated by the second distribution server S2 in the previously created first repository.

The deployment application 88 then requests from the third distribution server S3 in step 140, the creation of a second account for the same user, while providing the third distribution server S3 with the security elements contained in the security container 92.

Following this request from the deployment application 88, the third distribution server S3 in step 150, creates the second repository, the latter being assigned to the second account created for the user.

Finally, in step 160, following the creation of the second account in the third distribution server S3, the deployment application 88 publishes the software components C1, C2, C3, . . . Cn intended for the third distribution server S3. The software components C1, C2, C3, . . . , Cn are then integrated by the third distribution server S3 in the previously created second repository.

In addition, the deployment application 88 publishes secure configurations, each one being associated with a software component C1, C2, C3, . . . , Cn respectively. When appropriate, secure configurations are also integrated by the third distribution server S3 in the previously created second repository.

Thus, at the end of this deployment, the slip previously generated is transmitted to the user, or, alternatively, the information D1, D2, D3, D4 forming the deployment file 84 is directly stored in the first memory 22 at a predetermined address. The data package 86 containing, in particular, the second application L2 is stored in the third memory 44. The software components C1, C2, C3, . . . , Cn, as well as, optionally, the associated secure configurations, are stored in the fourth memory 56. The first application L1 is also stored in the second memory 32 of the first distribution server S1, the latter being for public access. The computer system 10 is then configured to allow the downloading of the software components C1, C2, C3, . . . , Cn to the first memory 22.

Figure 3:
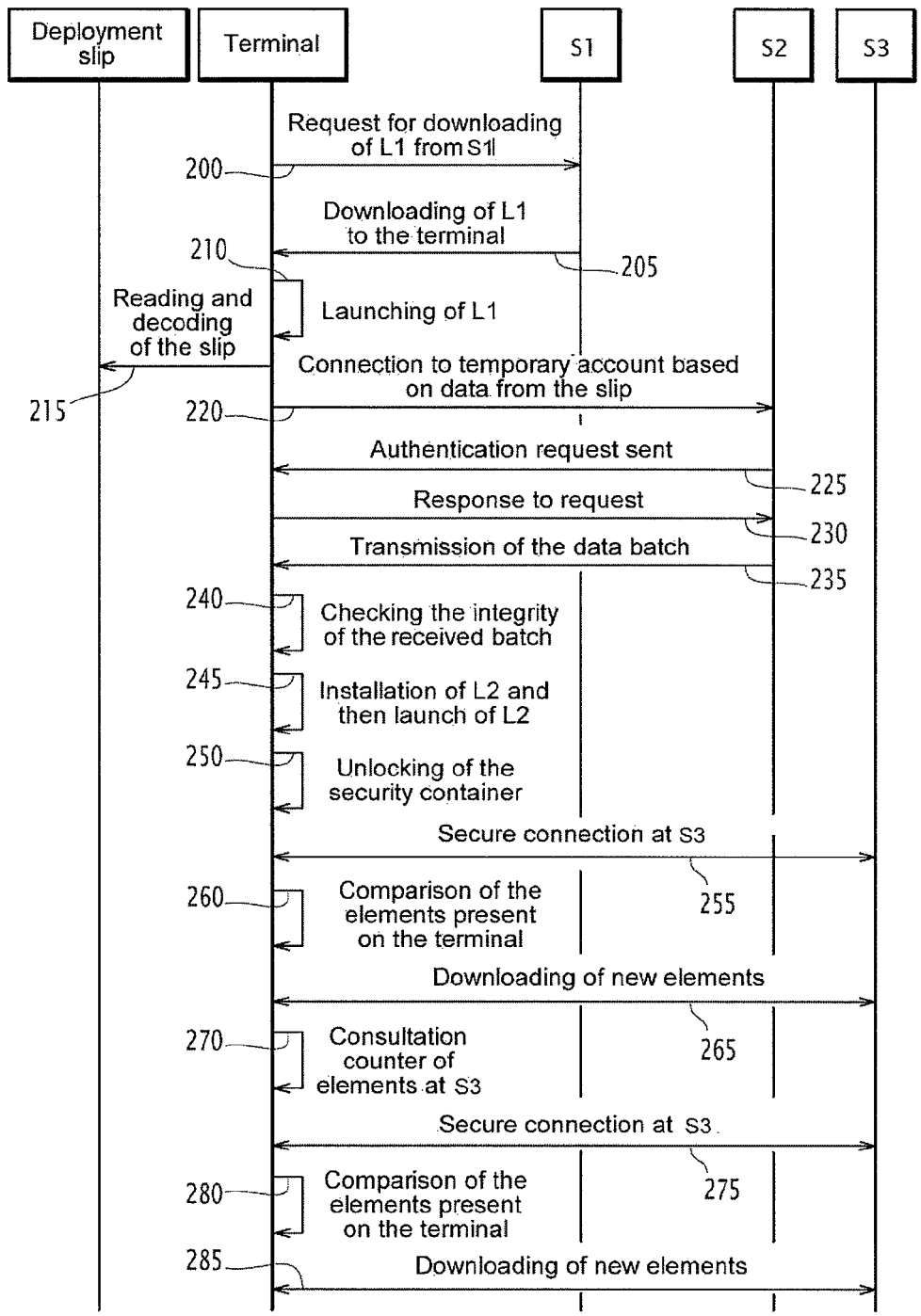
FIG. 3 shows a flowchart of a downloading method according to an embodiment, for downloading at least one software component to the computing device.

The downloading method of the software components C1, C2, C3, . . . , Cn to the first memory 22 of the computing device 12 will now be described using the flowchart shown in FIG. 3.

During the initial step 200, the user of the computing device 12, also called a terminal, performs a download request from the first application L1 at the first distribution server S1. The procedure for connecting to the first distribution server S1 to download the first application L1 is, for example, described in the email used to transmit the slip to the user.

The first application L1 is then downloaded to the first memory 22 of the terminal in step 205 using the first downloading capability 74.

The first application L1 is then launched by the user in step 210. In order to store the address D1 of the second distribution server, the authentication code D2, the cryptographic protection code D3 and the unlock code D4 forming the deployment file 84 in the first memory 22, the user scans, using the first application L1, a computer code such as a bar code or a two dimensional matrix code, also called QR code (Quick Response), that is given on the slip. The first application L1 is then able to decode the previously scanned computer code in order to recover said information D1, D2, D3, D4 forming the deployment file 84 and stored in the first memory 22. Alternatively, the deployment file 84 is stored at a predetermined address in the first memory 22, said predetermined address being known by the first application L1.

In the following step 215, the first application L1 then retrieves in the deployment file 84, the address D1 of the second distribution server S2 and the authentication code D2 for connecting securely to the second distribution capability S2.

The first application L1 then connects to the second distribution server S2 in step 220, by using the address D1, and then requests the opening of a session using the first temporary account associated with the user by providing the authentication code D2.

Following this request to open a session, the second distribution server S2 sends an authentication request to terminal 12 in step 225. The authentication request sent by the second distribution server S2 requires, for example, a human action in order to generate the response, such as the provision by the user of a response to a challenge-response test, also called captcha (completely automated public Turing test to tell computers and humans apart). This automatically differentiates a human from a computer program, and so provides protection against the intrusion of an unauthorised person using a brute force attack.

Following the intervention by the user to meet the challenge-response test, in step 230, terminal 12 sends a response to the authentication request from the second distribution server S2, while the second distribution server S2 opens the session at the first temporary account, upon receipt of the response to its request for authentication.

Alternatively, the second distribution server S2 does not send an authentication request to terminal 12, but directly opens a session at the first temporary account after providing the authentication code D2. In other words, steps 225 and 230 are not performed according to this alternative.

After opening the session on the first temporary user account, the second distribution server S2 transmits, in step 235, the data package 86 to terminal 12.

In the next step 240, the first application L1 then records the data package 86 received from the first memory 22 of the terminal, and extracts said data package 86 of the second application L2. In addition, the first application L1 checks the integrity of the second application L2 extracted from the data package 86 received. This check is, for example, a cryptographic operation using the cryptographic protection code D3 in the second application L2, the latter being protected cryptographically.

In addition when the data package 86 also comprises a secure configuration file 90 and/or a security container 92, the first application L1 securely extracts the configuration file 90 and/or the security container 92 from said data package 86.

If the cryptographic verification operation of the second application L2 succeeds, then, in step 245, the first application L1 installs the second application L2 in the first memory 22 of the terminal. In addition, the first application L1 copies the secure configuration file 90 and/or the security container 92 in a repository of the first memory 22 that is accessible by the second application L2. The first application L1 then launches the second application L2, and transmits the security container unlock code D4 if said container 92 is present in the data package 86 received.

Alternatively, if the security container 92 is not present in the data package 86 received, then said container is, for example, already present in the first memory 22 of the terminal, and is therefore already unlocked.

In step 250, the second application L2 then unlocks the security container 92 in order to recover the security elements, such as keys or even a certificate that are necessary for secure connection with the third distribution server S3. In other words, the security elements from the security container 92 are associated with the cryptographic protection of the data to be exchanged between the third distribution server S3 and the terminal 12.

The second application L2 and the third distribution server S3 then reciprocally authenticate one another in step 255, using the security elements from the security container 92 in order to then establish secure cryptographically protected communication between them. Reciprocal authentication is a reciprocal authentication of the terminal 12 with the third distribution server S3, and the third distribution server S3 with the terminal 12. In other words, reciprocal authentication includes authentication of the computing device 12 with the third distribution capability S3 and authentication of the third distribution capability S3 with the computing device 12. The second application L2 authenticates the user of the terminal 12 with the third distribution server S3, for example, with another authentication code D5.

When the data package 86 includes both the secure configuration file 90 and the security container 92, the information enabling the second application L2 to authenticate the terminal 12 with the third distribution server S3, is contained in the secure configuration file 90. The information contained in the secure configuration file 90 includes in particular the address of the third distribution server S3 and a method for connection to the third distribution server S3. The configuration file 90 is itself protected cryptographically with a key contained in the security container 92, said security container 92 being unlocked using the unlock code D4. The security elements, also called secret elements, associated with the cryptographic protection of the data to be exchanged between the third distribution server S3 and the terminal 12, are also contained in the security container 92.

During step 260, after the reciprocal authentication between the terminal 12 and the third distribution server S3, the second application L2 automatically connects to the third distribution server S3 in order to retrieve the list of software components C1, C2, . . . , Cn present in the fourth memory 56. The second application L2 then compares the list provided by the third distribution server S3 with the software components already present in the first memory 22 of the terminal, in order to only download elements that are new compared to those already present in the first memory 22.

In addition, the fourth memory 56 of the third distribution server is also able to store secure configuration files associated with the software components, as well as any updating of the security container 92. If necessary, said configuration files and the updating of the security container 92 are also mentioned in the list communicated by the third distribution server S3 to the second application L2.

During step 265, the second application L2 then downloads said elements that are new compared to those already present in the first memory 22. The second application L2 also automatically installs the software components C1, C2, . . . , Cn after downloading them, or updates them.

In step 270, the second application L2 finally informs a consultation counter of the elements in the fourth memory 56 of the third distribution server, as well as the elements downloaded to the first memory 22 of the terminal from the third distribution server S3. This allows easier later reiteration of the comparison of the list provided by the third distribution server S3 with the elements present in the first memory 22.

Indeed, the second application L2 connects securely and regularly with the third distribution server S3 (step 275) in order to compare again the elements present in the fourth memory 56 of the third distribution server, with those stored in the first memory 22 of the terminal (step 280) and to download any elements that are new compared with those already present in the first memory 22 (step 285). The new elements downloaded from the third distribution server S3 are then installed by the second application L2, or allow an update of all or part of the elements already present in the first memory 22 of the terminal.

The downloading method according to at least one embodiment thus allows the downloading the software components C1, C2, . . . , Cn with a high level of security to the first memory 22 of the terminal, by downloading the second application L2 to the first memory 22 after secure authentication of the first application L1 at the second distribution server S2, and by the subsequent secure connection at the third distribution server S3 via the second application L2, in order to download said software components C1, C2, . . . , Cn from the third distribution server S3 to the first memory 22 of the computing device.

The downloading method according to at least one embodiment is then used to counter a plurality of known threats such as identity theft, theft of sensitive information, compromise of the information system of the enterprise, unavailability of the information system of the enterprise, and theft of know-how. Identity theft is the case where an unauthorised person manages to install an unauthorised application in the memory of the terminal. The theft of sensitive information is the situation where an unauthorised person manages to retrieve sensitive information from the user during the installation of software components. The compromising of the information system of the enterprise is when an unauthorised person enters the corporate information system by exploiting a flaw in the software component downloading procedure. The unavailability of the information system of the enterprise is likely to occur through the capabilities used for downloading the software components. Finally, the theft of know-how is the case when the software components to be downloaded to the memory of the terminal are intercepted by an unauthorised user during their downloading, the unauthorised user then trying to get the source code of the intercepted software components via a retro-analysis.

Protection against threats like the theft of sensitive information or identity theft is achieved by the fact that only the second application L2 is able to connect to the third distribution server S3 in order to download the software components, while access to the second application L2 is also secure. In addition, this connection to the third distribution server S3 is desirably performed using security elements, also called secret elements, said elements being associated with each user and are known only to the user. Protection against threats such as compromising the information system of the enterprise and the unavailability of the information system of the enterprise is ensured by the high security of the connection to the third distribution server S3, the latter being intended to be connected to the information system of the enterprise wishing to implement the downloading of said software components. Finally, protection against theft of know-how results, in particular, from the secure transmission of the second application L2 at the second distribution server S2 to the first memory 22 of the computing device and the secure transmission of the software components C1, C2, . . . , Cn from the third distribution server S3 to the first memory 22.

In addition, the downloading method according to at least one embodiment allows limitation of the number of actions of the user of the computing device 12 that are required to download the software components C1, C2, . . . , Cn to the first memory 22 of said computing device. In fact, the only actions required of the user are the downloading request of the first application L1 from the first distribution server S1 and the launching of the first application L1 when it is downloaded from the first memory 22, and, optionally, the response to the challenge-response test when an authentication request is sent by the second distribution server S2 to the computing device 12 in order to further increase the security level (steps 225 and 230).

The deployment of the second application L2 in the third memory 44 of the second distribution server and that of the software components C1, C2, . . . , Cn in the fourth memory 56 of the third distribution server also requires a minimum of actions of the operators responsible for this deployment.

Thus, the downloading method according to at least one embodiment improves the security of the software component(s), while facilitating the implementation of said downloading.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

The invention claimed is:

1. A method for downloading at least one software component to a computing device, the method being implemented by the computing device comprising an information processing unit having a memory, the method comprising:
   downloading into the memory a first application from a first distribution capability; and
   connecting via the first application to a second distribution capability,
   wherein the connection to the second distribution capability is performed securely using an authentication code, and wherein the method further comprises:
      downloading into the memory a second application from the second distribution capability, wherein the second application is encapsulated in a package protected by a cryptographic protection code, and, during downloading of the second application, the protected package is sent from the second distribution capability to the computer device;
      securely connecting, via the second application to a third distribution capability; and
      downloading into the memory the software component from the third distribution capability,
      wherein, during the connection to the third distribution capability and/or the downloading of each software component, the data exchanged between the third distribution capability and the computing device are protected by cryptographic protection, and
      wherein security elements associated with the cryptographic protection of the data exchanged between the third distribution capability and the computing device are stored in a security container, the security container being cryptographically protected by an unlock code and the container is encapsulated in the protected package received from the second distribution capability.

2. The method of claim 1, wherein after downloading of the package comprising the second application, the first application performs a cryptographic operation using the cryptographic protection code to extract the second application from the package.

3. The method of claim 1, wherein the authentication code, the cryptographic protection code and the unlock code are stored in the memory of the computing device prior to the downloading of the first application.

4. The method of claim 3, wherein the authentication code, the cryptographic protection code and the unlock code are different from each other.

5. The method of claim 1, wherein the downloading of the second application is carried out directly by the first application.

6. The method of claim 1, wherein the connecting step to the third distribution capability includes authentication of the computing device at the third distribution capability and authentication of the third distribution capability at the computing device in order to perform reciprocal authentication of the computing device and the third distribution capability.

7. The method of claim 1, wherein the secure connection to the third distribution capability is established via the use of a code that is different from the authentication code used for the secure connection to the second distribution capability.

8. The method of claim 7, wherein the secure connection to the second distribution capability has a different security level than that of the secure connection to the third distribution capability.

9. A non-transitory computer-readable medium including a computer program comprising software instructions that, when implemented by an information processing unit integrated with a computing device, implements the downloading method according to claim 1.

10. A computing device, comprising an information processing unit having a memory, the memory having a downloading application configured to download at least one software component, the downloading application comprising:
- a first capability configured to download a first application into the memory from a first distribution capability, the first application being configured to connect to a second distribution capability,
- wherein the first application is configured to connect to the second distribution capability in a secure manner using an authentication code, and
- wherein the memory is configured to store:
  - a second capability configured to download a second application into the memory from the second distribution capability, the second application being configured to connect securely to a third distribution capability, the second application being further configured to be encapsulated in a package protected by a cryptographic protection code, and, during downloading of the second application, the protected package is configured to be sent from the second distribution capability to the computer device; and
  - a third capability configured to download each software component from the third distribution capability into the memory,
  - wherein, during a connection to the third distribution capability and/or the downloading of each software component, the data exchanged between the third distribution capability and the computing device are configured to be protected by cryptographic protection, and
  - wherein security elements associated with the cryptographic protection of the data exchanged between the third distribution capability and the computing device are configured to be stored in a security container, the security container being configured to be cryptographically protected by an unlock code and the container is encapsulated in the protected package received from the second distribution capability.

11. A computer system comprising at least one computing device according to claim 10, a first distribution capability, a second distribution capability, and a third distribution capability, each distribution capability being connected to each computing device by a data link.

12. The computer system of claim 11, wherein the system further comprises a deployment capability, the deployment capability being configured to request from the second distribution capability the creation of a first repository, and to send to the second distribution capability the second application for insertion into the first repository, the deployment capability being configured to request from the third distribution capability, the creation of a second repository and to send to the third distribution capability each software component for inclusion in the second repository.

13. The computing device of claim 10, wherein the secure connection to the third distribution capability is established via the use of a code that is different from the authentication code used for the secure connection to the second distribution capability.

14. The computing device of claim 13, wherein the secure connection to the second distribution capability has a different security level than that of the secure connection to the third distribution capability.

* * * * *